(12) United States Patent
Hayashi (10) Patent No.: US 8,315,481 B2
(45) Date of Patent: Nov. 20, 2012

(54) IMAGE TRANSMITTING APPARATUS, IMAGE RECEIVING APPARATUS, IMAGE TRANSMITTING AND RECEIVING SYSTEM, RECORDING MEDIUM RECORDING IMAGE TRANSMITTING PROGRAM, AND RECORDING MEDIUM RECORDING IMAGE RECEIVING PROGRAM

(75) Inventor: Kazuyoshi Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 12/367,063

(22) Filed: Feb. 6, 2009

(65) Prior Publication Data

US 2009/0202169 A1 Aug. 13, 2009

(30) Foreign Application Priority Data

Feb. 7, 2008 (JP) ................ P2008-027366

(51) Int. Cl.
*G06K 9/32* (2006.01)
(52) U.S. Cl. ........ 382/299; 382/274; 382/275; 382/291; 382/3.26; 382/3.27; 382/463
(58) Field of Classification Search .................. 382/278, 382/282, 284, 300; 358/3.26, 3.27, 463
See application file for complete search history.

(56) References Cited

U.S. PATENT DOCUMENTS

| | | | | |
|---|---|---|---|---|
| 5,625,766 A | * | 4/1997 | Kauffman | 382/294 |
| 5,983,176 A | * | 11/1999 | Hoffert et al. | 704/233 |
| 6,493,878 B1 | * | 12/2002 | Kassatly | 725/144 |
| 6,750,903 B1 | | 6/2004 | Miyatake et al. | |
| 6,978,418 B1 | * | 12/2005 | Bain et al. | 715/205 |
| 2007/0091120 A1 | | 4/2007 | Oura | |

FOREIGN PATENT DOCUMENTS

| | | |
|---|---|---|
| JP | 11 252428 | 9/1999 |
| JP | 2000-278683 | 10/2000 |
| JP | 2000-333156 | 11/2000 |
| JP | 2005-260501 | 9/2005 |
| JP | 2005-295215 | 10/2005 |
| JP | 2006-74114 | 3/2006 |
| JP | 2006-92450 | 4/2006 |
| JP | 2006-93839 | 4/2006 |
| JP | 2006-135824 | 5/2006 |
| JP | 2006 145944 | 6/2006 |
| JP | 2007 108447 | 4/2007 |
| JP | 2007-194928 | 8/2007 |

* cited by examiner

*Primary Examiner* — Yosef Kassa
(74) *Attorney, Agent, or Firm* — Frommer Lawrence & Haug LLP; William S. Frommer; Ellen Marcie Emas (57) ABSTRACT

An image transmitting apparatus includes a region detecting unit detecting, in an image, a region of interest matching a predetermined condition; a resolution converting unit selecting, for reducing resolution of the image, an image passed through a low-pass filter as an image outside the detected region of interest and an image not passed through the low-pass filter as an image inside the region of interest; and a transmitting unit transmitting the image with reduced resolution and positional information of the region of interest. An image receiving apparatus includes a resolution restoring unit performing image quality improvement processing on the region of interest obtained from the positional information and included in the image transmitted from the image transmitting apparatus so as to increase resolution in the region of interest; and a combining unit combining the image inside the processed region of interest with the image outside the region of interest.

13 Claims, 8 Drawing Sheets

IMAGE TRANSMITTING APPARATUS, IMAGE RECEIVING APPARATUS, IMAGE TRANSMITTING AND RECEIVING SYSTEM, RECORDING MEDIUM RECORDING IMAGE TRANSMITTING PROGRAM, AND RECORDING MEDIUM RECORDING IMAGE RECEIVING PROGRAM

CROSS REFERENCES TO RELATED APPLICATIONS

The present invention contains subject matter related to Japanese Patent Application JP 2008-027366 filed in the Japanese Patent Office on Feb. 7, 2008, the entire contents of which are incorporated herein by reference.

BACKGROUND OF THE INVENTION

1. Field of the Invention

The present invention relates to an image transmitting apparatus capable of dividing an image into a region of interest and a region of non-interest, applying different types of processing to images in the respective regions, and transmitting the processed images; an image receiving apparatus capable of receiving and combining together the images in the region of interest and region of non-interest transmitted from the image transmitting apparatus; an image transmitting and receiving system including the image transmitting apparatus and the image receiving apparatus; an image transmitting program; and an image receiving program.

2. Description of the Related Art

Instead of an analog camera system that has been used, an Internet protocol (IP) camera system based on network transmission is beginning to be used as a monitoring camera system. The IP camera system allows monitoring from remote locations and construction of a large-scale system. However, as the system size increases, an increase in necessary transmission capacity (bandwidth) and recording (storage) capacity becomes a greater problem (see Japanese Unexamined Patent Application Publications Nos. 2006-145944, 2007-108447, and 11-252428).

Figure 10:
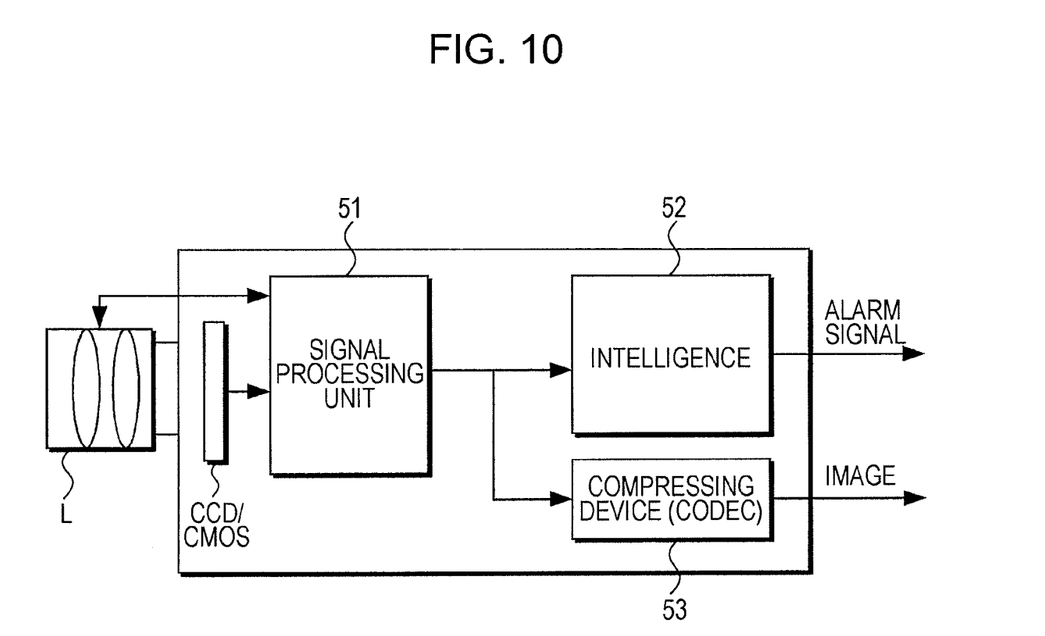
FIG. 10 is a block diagram illustrating a configuration of a monitoring camera of the related art.

FIG. 10 is a block diagram illustrating a configuration of a monitoring camera (IP output type) of the related art. A video image picked up through a lens L by a charge-coupled device (CCD) sensor or a complementary metal oxide semiconductor (CMOS) sensor passes through a signal processing unit 51 and becomes image data. The image data is transmitted to a compressing device (codec) 53 and the compressed image data is distributed to a network. In the example of FIG. 10, a region of importance is extracted by intelligence 52. For example, detection of a moving object can be made by the intelligence 52. Typically, an image is compressed by the compressing device 53 and, at the same time, subjected to "intelligence" processing, such as moving object detection. Then, if an intruder or the like is detected, the intelligence 52 generates an alarm or outputs the detected region as metadata.

Particularly in recent years, by using a high-pixel CCD or CMOS image sensor, it has been possible to capture images at high resolution without depending on a television format used in an analog monitoring camera of the related art. When a target image is captured at high resolution, it is possible to define a wider area as a monitoring area and check an object in more detail. However, as the image resolution increases, the amount of information increases proportionately. This causes an increase in necessary transmission and storage capacities, and thus burdens the system construction.

For capturing images at high resolution, it is necessary to reduce the amount of data to minimize the burden caused by an increase in the amount of information. For example, the amount of image data can be reduced by increasing the compression ratio in image compression (codec) or by reducing the image.

SUMMARY OF THE INVENTION

In the method in which the amount of data is reduced by increasing the compression ratio in image compression, image quality is degraded since it is difficult to take full advantage of high-resolution image capturing.

Generally, when an image is captured at high resolution, if, for example, the user wants to monitor a wide area, an unnecessary region is displayed to the user simultaneously with a region that the user originally intends to monitor. Moreover, for example, when the user wants to view an image at higher resolution than before, a region which is not particularly necessary to be displayed at high resolution is displayed to the user at high resolution.

When image capturing is performed with a wide angle of view, the ratio of a region of importance to the entire monitoring image is often small. For example, for monitoring an intruder, it is necessary that only the intruder be displayed or recorded at high resolution. In other words, it is not necessary to check in detail a region or background with little or no change. That is, even when the resolution of an image sensor is improved, a region of less importance (e.g., background region) may be transmitted or recorded at lower resolution, as long as the resolution of a region of importance is maintained. This is advantageous, for example, in that necessary transmission and storage capacities can be reduced.

As an example of methods for assigning different resolutions to different regions, there is a method in which a region of less importance in a high-resolution image is transmitted after being low-pass-filtered and a region of importance in the high-resolution image is transmitted without being low-pass-filtered. In this method, since high-frequency components in the low-pass-filtered region are reduced by a compressing device (codec), the compression ratio is increased and the amount of data is reduced as a result. However, since the resolution of the image remains the same as the original resolution, the amount of data is not greatly reduced.

Accordingly, it is desirable to provide a technique for improving image resolution in a region of importance while reducing capacities necessary for image transmission and storage.

An image transmitting apparatus according to an embodiment of the present invention includes region detecting means for detecting, in an image, a region of interest that matches a predetermined condition; resolution converting means for selecting, for reducing resolution of the image, an image passed through a low-pass filter as an image outside the region of interest detected by the region detecting means and an image not passed through the low-pass filter as an image inside the region of interest; and transmitting means for transmitting, to a destination, the image with resolution reduced by the resolution converting means and positional information of the region of interest.

In the embodiment described above, necessary transmission and storage capacities can be reduced by reducing resolution of an image. At the same time, for a region of interest in this image, an image reduced in resolution without being passed through the low-pass filter is transmitted, while for a region of non-interest in this image, an image reduced in resolution after being passed through the low-pass filter is transmitted. Thus, for the region of interest, the image not passed through the low-pass filter can be converted to a high-resolution image on the reception side.

An image transmitting apparatus according to an embodiment of the present invention includes region detecting means for detecting, in an image, a region of interest that matches a predetermined condition; resolution converting means for applying, for reducing resolution of the image, low-pass filters having different characteristics to an image inside the region of interest detected by the region detecting means and an image outside the region of interest; and transmitting means for transmitting, to a destination, the image with resolution reduced by the resolution converting means and positional information of the region of interest.

In the embodiment described above, necessary transmission and storage capacities can be reduced by reducing resolution of an image. At the same time, low-pass filters having different characteristics are applied to a region of interest in the image and a region of non-interest in the image. Thus, for the region of non-interest, an image reduced in the amount of data can be transmitted, while for the region of interest, an image that can be converted to a high-resolution image on the reception side can be transmitted.

An image receiving apparatus according to an embodiment of the present invention includes receiving means for receiving an image and positional information of a region of interest in the image, the image and the positional information being transmitted from an image transmitting apparatus; resolution restoring means for performing image quality improvement processing on the region of interest in the image received by the receiving means, the region of interest being obtained from the positional information, to increase resolution in the region of interest; and combining means for combining an image inside the region of interest processed by the resolution restoring means with an image outside the region of interest.

In the embodiment described above, an image and positional information of a region of interest in the image are transmitted from the image transmitting apparatus. Thus, by using the transmitted image and positional information, image quality improvement processing for increasing resolution can be performed on the region of interest, while the amount of data to be processed in a region outside the region of interest can be reduced.

An image transmitting and receiving system according to an embodiment of the present invention includes an image transmitting apparatus and an image receiving apparatus. An image is transmitted from the image transmitting apparatus to the image receiving apparatus. The image transmitting apparatus includes region detecting means for detecting, in the image, a region of interest that matches a predetermined condition; resolution converting means for selecting, for reducing resolution of the image, an image passed through a low-pass filter as an image outside the region of interest detected by the region detecting means and an image not passed through the low-pass filter as an image inside the region of interest; and transmitting means for transmitting, to a destination, the image with resolution reduced by the resolution converting means and positional information of the region of interest. The image receiving apparatus includes receiving means for receiving the image and the positional information of the region of interest in the image, the image and the positional information being transmitted from the image transmitting apparatus; enlarging means for enlarging the image received by the receiving means; resolution restoring means for performing image quality improvement processing on the region of interest in the image received by the receiving means, the region of interest being obtained from the positional information, to increase resolution in the region of interest; and combining means for combining an image in the region of interest processed by the resolution restoring means with the image enlarged by the enlarging means.

In the embodiment described above, necessary transmission and storage capacities can be reduced by reducing resolution of an image. Then, for a region of interest in this image, an image reduced in resolution without being passed through the low-pass filter is transmitted from the image transmitting apparatus, while for a region of non-interest in this image, an image reduced in resolution after being passed through the low-pass filter is transmitted from the image transmitting apparatus. Thus, for the region of interest, the image receiving apparatus can perform image quality improvement processing on the image not passed through the low-pass filter.

An image transmitting and receiving system according to an embodiment of the present invention includes an image transmitting apparatus and an image receiving apparatus. An image is transmitted from the image transmitting apparatus to the image receiving apparatus. The image transmitting apparatus includes region detecting means for detecting, in the image, a region of interest that matches a predetermined condition; resolution converting means for applying, for reducing resolution of the image, low-pass filters having different characteristics to an image inside the region of interest detected by the region detecting means and an image outside the region of interest; and transmitting means for transmitting, to a destination, the image with resolution reduced by the resolution converting means and positional information of the region of interest. The image receiving apparatus includes receiving means for receiving the image and the positional information of the region of interest in the image, the image and the positional information being transmitted from the image transmitting apparatus; enlarging means for enlarging the image received by the receiving means; resolution restoring means for performing image quality improvement processing on the region of interest in the image received by the receiving means, the region of interest being obtained from the positional information, to increase resolution in the region of interest; and combining means for combining an image in the region of interest processed by the resolution restoring means with the image enlarged by the enlarging means.

In the embodiment described above, in the image transmitting apparatus, necessary transmission and storage capacities can be reduced by reducing resolution of an image. At the same time, low-pass filters having different characteristics are applied to a region of interest in the image and a region of non-interest in the image. Thus, the amount of data in the region of non-interest can be reduced, while the image receiving apparatus can perform image quality improvement processing on the region of interest.

A computer-readable recording medium recording an image transmitting program for causing a computer to execute processing according to an embodiment of the present invention includes the steps of detecting, in an image, a region of interest that matches a predetermined condition; selecting, for reducing resolution of the image, an image passed through a low-pass filter as an image outside the detected region of interest and an image not passed through the low-pass filter as an image inside the region of interest; and transmitting, to a destination, the image with reduced resolution and positional information of the region of interest.

In the embodiment described above, necessary transmission and storage capacities can be reduced by reducing resolution of an image. Then, for a region of interest in this image, an image reduced in resolution without being passed through the low-pass filter is transmitted, while for a region of non-interest in this image, an image reduced in resolution after being passed through the low-pass filter is transmitted. Thus, for the region of interest, the image not passed through the low-pass filter can be converted to a high-resolution image on the reception side.

A computer-readable recording medium recording an image transmitting program for causing a computer to execute processing according to an embodiment of the present invention includes the steps of detecting, in an image, a region of interest that matches a predetermined condition; applying, for reducing resolution of the image, low-pass filters having different characteristics to an image inside the detected region of interest and an image outside the region of interest; and transmitting, to a destination, the image with reduced resolution and positional information of the region of interest.

In the embodiment described above, necessary transmission and storage capacities can be reduced by reducing resolution of an image. At the same time, low-pass filters having different characteristics are applied to a region of interest in the image and a region of non-interest in the image. Thus, for the region of non-interest, an image reduced in the amount of data can be transmitted, while for the region of interest, an image that can be converted to a high-resolution image on the reception side can be transmitted.

A computer-readable recording medium recording an image receiving program for causing a computer to execute processing according to an embodiment of the present invention includes the steps of receiving an image and positional information of a region of interest in the image, the image and the positional information being transmitted from an image transmitting apparatus; performing image quality improvement processing on the region of interest in the received image, the region of interest being obtained from the positional information, to increase resolution in the region of interest; and combining an image inside the region of interest subjected to the image quality improvement processing with an image outside the region of interest.

In the embodiment described above, an image and positional information of a region of interest in the image are transmitted from the image transmitting apparatus. Thus, by using the transmitted image and positional information, image quality improvement processing for increasing resolution can be performed on the region of interest, while the amount of data to be processed in a region outside the region of interest can be reduced.

According to an embodiment of the present invention, while capacities necessary for image transmission and storage can be reduced, a high-quality image can be restored in a region of importance. That is, while a data transmission load placed on the network can be reduced, resolution in the region of importance can be improved and thus, an accurate monitoring operation can be performed.

DESCRIPTION OF THE PREFERRED EMBODIMENTS

Hereinafter, embodiments of the present invention will be described with reference to the drawings.

(Image Transmitting and Receiving System)

Figure 1:
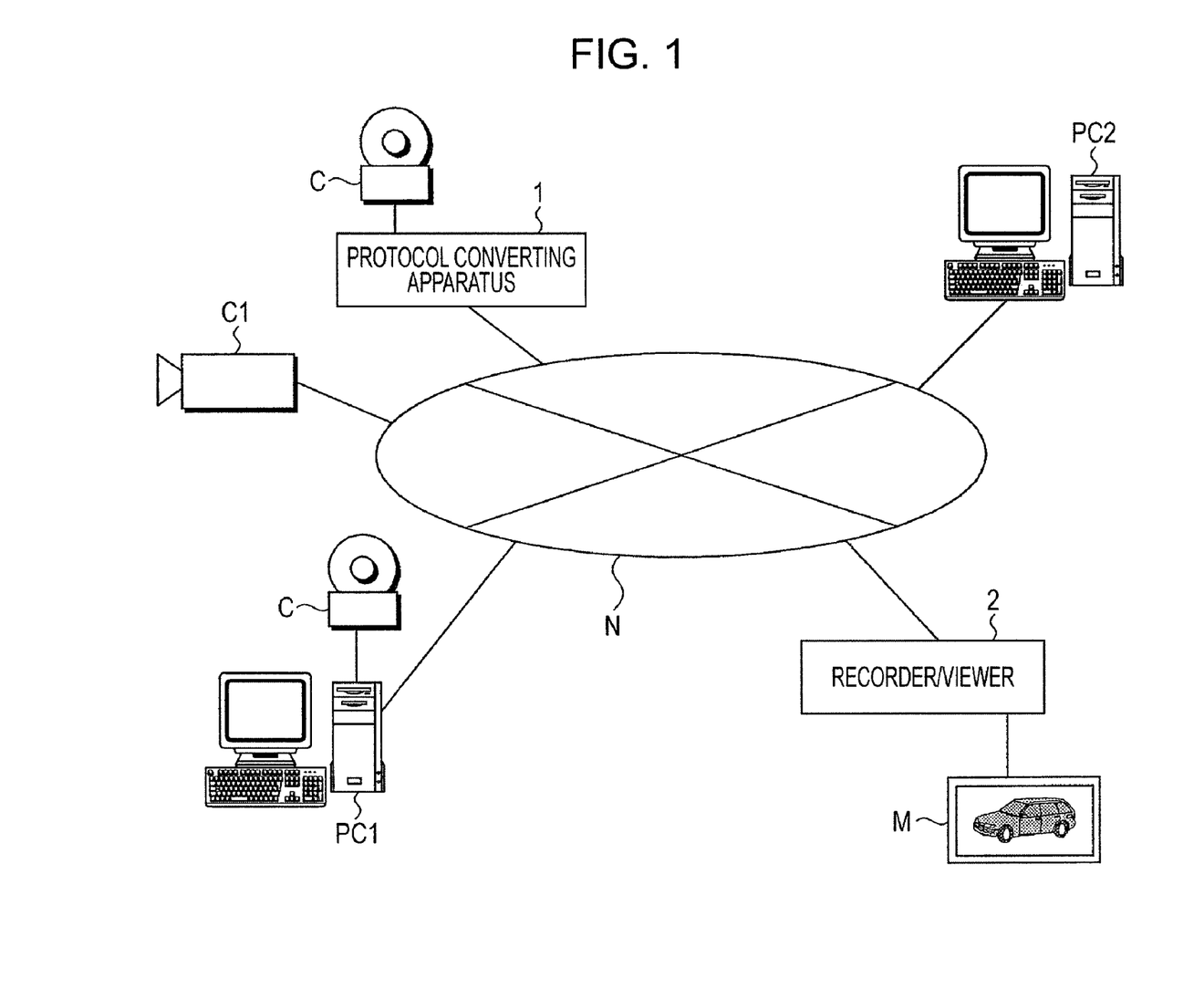
FIG. 1 illustrates a configuration of an image transmitting and receiving system.

FIG. 1 illustrates a configuration of an image transmitting and receiving system. The image transmitting and receiving system has a configuration in which image transmitting devices and image receiving devices are connected to one another via a network N. Examples of the transmitting devices include a camera C, a protocol converting apparatus 1, a transmitting camera C1 with a transmitting function, and a transmitting computer PC1 with a transmitting function. Examples of the receiving devices include a recorder/viewer 2 and a receiving computer PC2 with a receiving function.

An image transmitting apparatus of the present embodiment may be included in a transmitting device as a hardware component. Alternatively, an image transmitting program of the present embodiment may be implemented in a transmitting device as a software component. Likewise, an image receiving apparatus of the present embodiment may be included in a receiving device as a hardware component. Alternatively, an image receiving program of the present embodiment may be implemented in a receiving device as a software component.

The protocol converting apparatus 1 serving as a transmitting device converts an image (either a still image or a moving image) captured by the camera C into a data format according to a data transfer protocol used on the network N and transmits the resulting image. The camera C connected to the protocol converting apparatus 1 may be a general-purpose camera, such as an RGB camera, a composite camera, or a USB camera.

The transmitting camera C1 is a so-called IP camera (Internet camera) capable of outputting image data corresponding to a protocol on the network N. The transmitting camera C1 can be directly connected to a network router or hub.

The transmitting computer PC1 is a typical personal computer to which the general-purpose camera C can be connected. At the same time, the transmitting computer PC1 can be connected to the network N. When the image transmitting apparatus of the present embodiment is included in the transmitting computer PC1 as a hardware component, the image transmitting apparatus is implemented, for example, as an expansion board of the computer. When the image transmitting program of the present embodiment is implemented as a software component in the transmitting computer PC1, the image transmitting program installed in a storage device of the computer is executed by a central processing unit (CPU).

The transmitting computer PC1 may either be a general-purpose personal computer or a special-purpose computer in which the image transmitting apparatus or image transmitting program of the present embodiment is implemented.

The recorder/viewer 2 serving as a receiving device includes a recording unit for recording an image transmitted from a transmitting device via the network N and a reproducing unit for reproducing a recorded or transmitted image. A monitor M is connected to the recorder/viewer 2. A recorded past image or a current image transmitted from a transmitting device can be selected by a user operation and displayed on the monitor M.

The receiving computer PC2 is a typical personal computer and includes a monitor for displaying images. At the same time, the receiving computer PC2 can be connected to the network N. When the image receiving apparatus of the present embodiment is included in the receiving computer PC2 as a hardware component, the image receiving apparatus is implemented, for example, as an expansion board of the computer. When the image receiving program of the present embodiment is implemented as a software component in the receiving computer PC2, the image receiving program installed in a storage device of the computer is executed by a CPU.

The receiving computer PC2 may either be a general-purpose personal computer or a special-purpose computer in which the image receiving apparatus or image receiving program of the present embodiment is implemented.

(Image Transmitting Apparatus)

Figure 2:
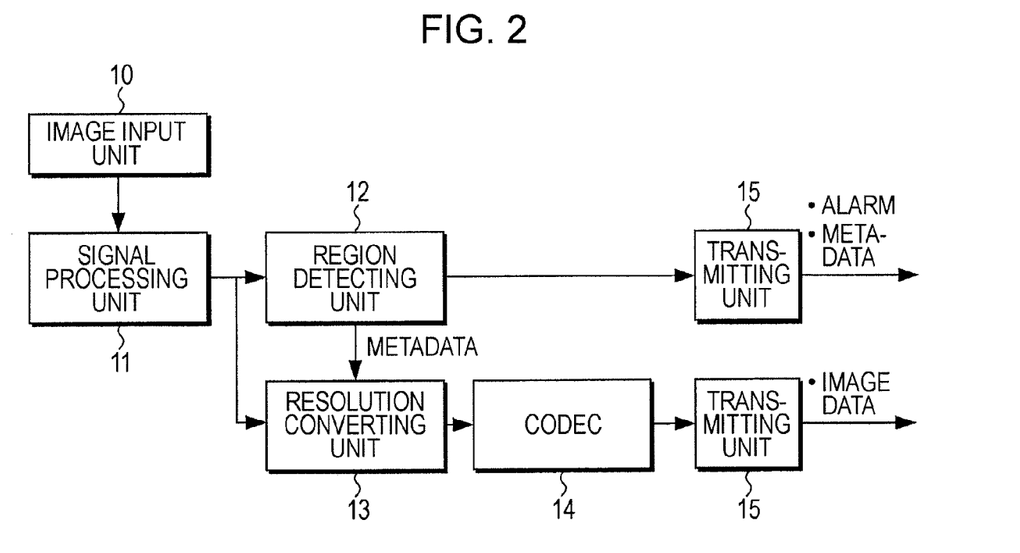
FIG. 2 is a block diagram illustrating a configuration of an image transmitting apparatus according to an embodiment of the present invention.

FIG. 2 is a block diagram illustrating a configuration of an image transmitting apparatus of the present embodiment. The image transmitting apparatus of the present embodiment includes at least a region detecting unit 12, a resolution converting unit 13, and transmitting units 15.

An image from an image input unit 10 is transmitted through a signal processing unit 11 to the region detecting unit 12. The image input unit 10 corresponds to an image pickup device of the camera C or transmitting camera C1 illustrated in FIG. 1. The image input unit 10 may input an image captured by a camera or obtained via the network N. The signal processing unit 11 performs predetermined image processing, such as noise reduction, on an image input by the image input unit 10. The signal processing unit 11 may be included in the camera C, transmitting camera C1, or protocol converting apparatus 1 illustrated in FIG. 1.

Figure 3:
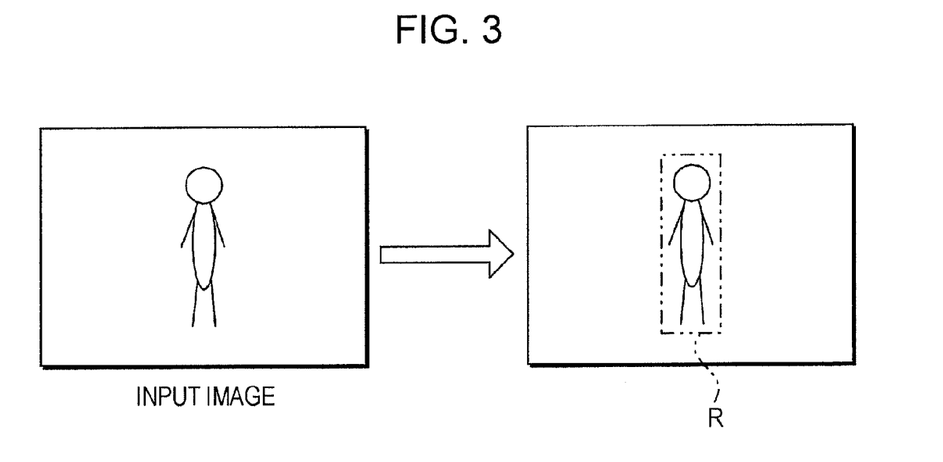
FIG. 3 illustrates moving object detection as an example of detection of a region of interest.

The region detecting unit 12 detects a region of interest that matches a predetermined condition. FIG. 3 illustrates moving object detection as an example of detection of a region of interest. The moving object detection involves detection of a region where, in an input image, a pixel value has changed by a predetermined amount or more. A condition of the moving object detection can be set in advance by the user. In the example of FIG. 3, there is no motion (change in pixel value) in the background of the input image, and a person appearing in the input image is detected as a moving object.

When a moving object is detected, a rectangular region including the detected moving object is output as a region of interest R. The region of interest R is written to metadata as coordinate values in the image. The region of interest R may be determined on a pixel-by-pixel basis or, for example, on a macroblock basis (each macroblock including 8 pixels) in view of characteristics of a codec described below.

The region of interest R detected by the region detecting unit 12 is output as metadata to the resolution converting unit 13 and the transmitting unit 15. The resolution converting unit 13 lowers the resolution of the input image data to perform reduction processing on the image. On the basis of the metadata of the region of interest R detected by the region detecting unit 12, the resolution converting unit 13 divides the input image data into a region to be low-pass-filtered and a region not to be low-pass-filtered. This operation of the resolution converting unit 13 will be described below in detail.

The image reduced by the resolution converting unit 13 is coded by a codec 14 and output via the transmitting unit 15 to the network N. Along with the image data coded by the codec 14, the transmitting unit 15 outputs the metadata of the region of interest R detected by the region detecting unit 12 and an alarm or warning, as necessary, to the network N.

(Resolution Converting Unit)

Figure 4:
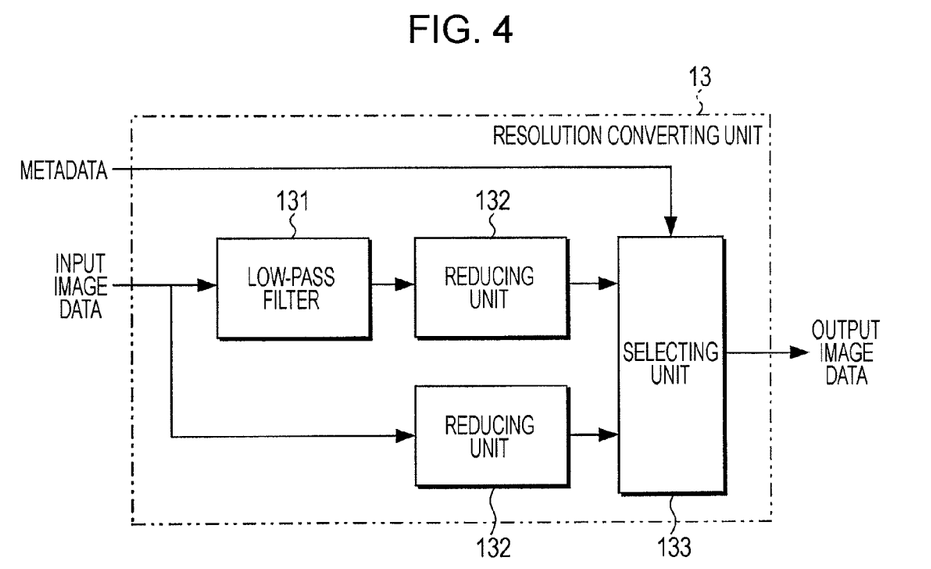
FIG. 4 is a block diagram illustrating a configuration of a resolution converting unit.

FIG. 4 is a block diagram illustrating a configuration of the resolution converting unit 13. The resolution converting unit 13 includes a low-pass filter 131, reducing units 132, and a selecting unit 133. The low-pass filter 131 is a circuit that removes specific high-frequency components from image data to reduce the amount of data of the image data. Various types of filters may be used as the low-pass filter 131. For example, an N-by-N (e.g., 3-by-3) pixel averaging filter may be used as the low-pass filter 131. The image data input to the resolution converting unit 13 is divided into one that is to be passed through the low-pass filter 131 and one that is not to be passed through the low-pass filter 131, and then input to the corresponding reducing units 132.

The reducing units 132 reduce the image of the image data. Specifically, the reducing units 132 decimate pixels in the image data to reduce the size of the image data. For example, the number of pixels is reduced to half.

The image data reduced by the reducing unit 132 after being passed through the low-pass filter 131 and the image data reduced by the reducing unit 132 without being passed through the low-pass filter 131 are transmitted to the selecting unit 133. On the basis of metadata (a result of detection of a region of interest, i.e., coordinate data) output from the region detecting unit 12 (see FIG. 2), the selecting unit 133 makes a selection between the image data reduced after being passed through the low-pass filter 131 and the image data reduced without being passed through the low-pass filter 131. That is, if the image data is within the region of interest, the selecting unit 133 selects the image data reduced without being passed through the low-pass filter 131, while if the image data is not within the region of interest, the selecting unit 133 selects the image data reduced after being passed through the low-pass filter 131.

The selection between the image data passed through the low-pass filter 131 and the image data not passed through the low-pass filter 131 may be made on a macroblock basis in the codec 14 (see FIG. 2) described above. For example, when a macroblock is a block of 8 by 8 pixels and the image data is reduced to half its original size, the foregoing selection is made on a 16-pixel block basis.

(Image Receiving Apparatus)

Figure 5:
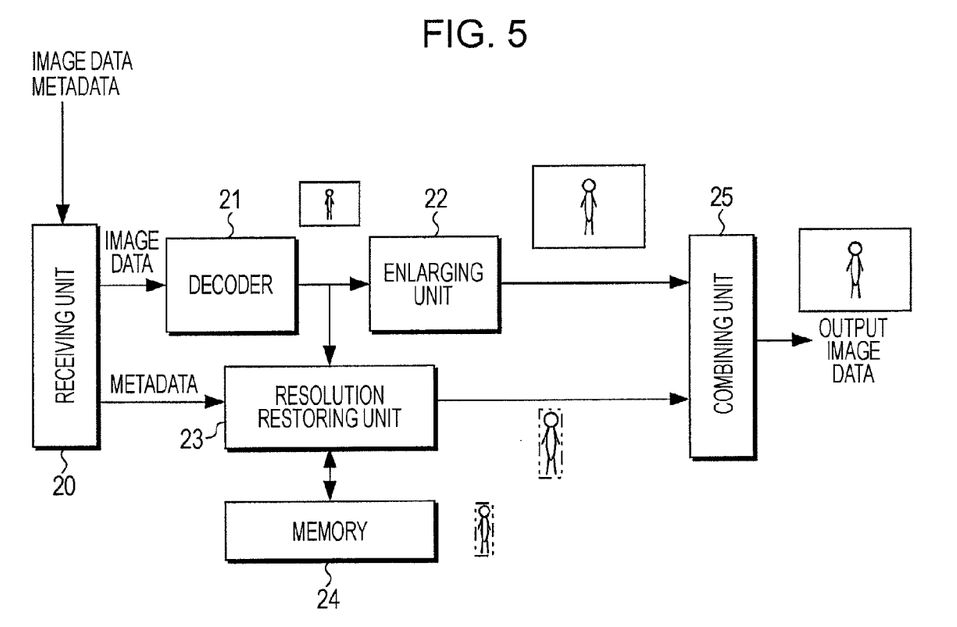
FIG. 5 is a block diagram illustrating a configuration of an image receiving apparatus according to an embodiment of the present invention.

FIG. 5 is a block diagram illustrating a configuration of the image receiving apparatus of the present embodiment. The image receiving apparatus of the present embodiment includes at least a receiving unit 20, a resolution restoring unit 23, and a combining unit 25.

The receiving unit 20 receives image data and metadata transmitted from the image transmitting apparatus described above. The receiving unit 20 can receive data in a format corresponding to a communication protocol on the network N (see FIG. 1).

The image data received by the receiving unit 20 is decoded by a decoder 21. If the image data has been reduced to half its original size by the image transmitting apparatus, the decoded image data is half its original size. The decoded image data is enlarged by an enlarging unit 22. For example, in the image data that is half its original size and decoded by the decoder 21, pixels are doubled in both the horizontal and vertical directions to restore the original size. In this enlargement processing, a smooth image can be produced by interpolation, such as linear interpolation. However, the resolution of the image is degraded from that of the original picked-up image.

In the present embodiment, by using coordinate information indicating the region of interest and extracted from the metadata received by the receiving unit 20, a resolution restoring unit 23 restores resolution in the region of interest. That is, the resolution restoring unit 23 uses the metadata as well as the decoded image data to restore the resolution only in the region of interest in the image data to a level close to the original level. Since image data in the region of interest is not passed through the low-pass filter 131 (see FIG. 4) in the resolution converting unit 13 (see FIG. 2) of the image transmitting apparatus, specific high-frequency components remain in the image data in the region of interest. By using this image data including the specific high-frequency components, the restoration of resolution to a level close to the original level is performed.

The image data in the region of interest is temporarily stored in a memory 24 after its resolution is restored by the resolution restoring unit 23 to a level close to the original level. Then, the image data temporarily stored in a memory 24 and the image data enlarged by the enlarging unit 22 are transmitted to and combined together by the combining unit 25. Thus, the resulting image data in which only the region of interest has high resolution can be output and displayed on the monitor.

Examples of resolution restoration techniques for restoring a high-resolution image from low-resolution images include a technique in which a plurality of time-series images are superimposed on one another on a sub-pixel basis to improve resolution (see, e.g., Shin AOKI, "Super Resolution Processing by Plural Number of Lower Resolution Images", Ricoh Technical Report, November 1998, No. 24, pp. 19-25).

This processing is performed in accordance with the following procedure:

1. From a plurality of pieces of image data, a displacement in sampling position of each of the pieces of image data during image capturing is estimated. It is necessary that an image capturing position or object be displaced over time.

2. The density of each image data is increased by using a broadband low-pass filter that passes all high-frequency components of an original signal including aliasing components. Here, it is necessary that aliasing distortion be present. Where possible, the optical low-pass filter is removed.

3. By taking a weighted sum using a weight depending on the sampling position of each high-density data, the aliasing distortion is cancelled and, at the same time, the high-frequency components of the original signal are restored.

When an image transmitting and receiving system is used as a monitoring camera, a region of importance is typically a distinctive region where some change, such as an intruding person or vehicle, is observed. Since the monitoring camera is generally fixed, the resolution may not be increased by the super resolution processing described above. However, since a region of importance for the monitoring camera is a distinctive region where there is observed an intruding person, vehicle, or the like which has movement or motion, the region of importance for the monitoring camera matches the first necessary condition for the super resolution processing, "It is necessary that an image capturing position or object be displaced over time" described above.

As for the second necessary condition for the super resolution processing "it is necessary that aliasing distortion be present. Where possible, the optical low-pass filter is removed" described above, it is possible to generate aliasing distortion if an image is reduced without using a low-pass filter, which is generally used. That is, if a normal image is captured using an optical low-pass filter (the resolution of this image is not increased) and then the image is reduced without using the low-pass filter, the original high-resolution image can be restored from a plurality of reduced images (if a moving object is captured).

Here, it is possible to reduce the entire region of an image having the original resolution without passing the image through the low-pass filter. However, since high-frequency components remain in the image, the compression ratio is degraded. Moreover, since the monitoring camera is fixed and the second necessary condition is not satisfied, it is difficult to produce a high-resolution image. Therefore, to reduce the data size of a background region of the image, it is better to apply a low-pass filter to the background region to remove high-frequency components therefrom.

The present embodiment is based on the circumstances described above. That is, when an image picked up by a high-resolution image sensor is to be transmitted, the resolution of the image is reduced to a level lower than that of the original image. To reduce the resolution, the image is divided into a region of importance (region of interest) and a region of less importance. Then, an image in the region of importance is reduced in resolution without being passed through the low-pass filter, so that a high-resolution image can be restored on the reproduction side. On the other hand, an image in the region of less importance is reduced in resolution after being passed through the low-pass filter, so that a smooth image with a small data size can be reproduced. Thus, while reducing necessary transmission and storage capacities, it is possible to improve resolution in the region of importance in the image picked up by the high-resolution image sensor.

(Image Transmitting Program)

Figure 6:
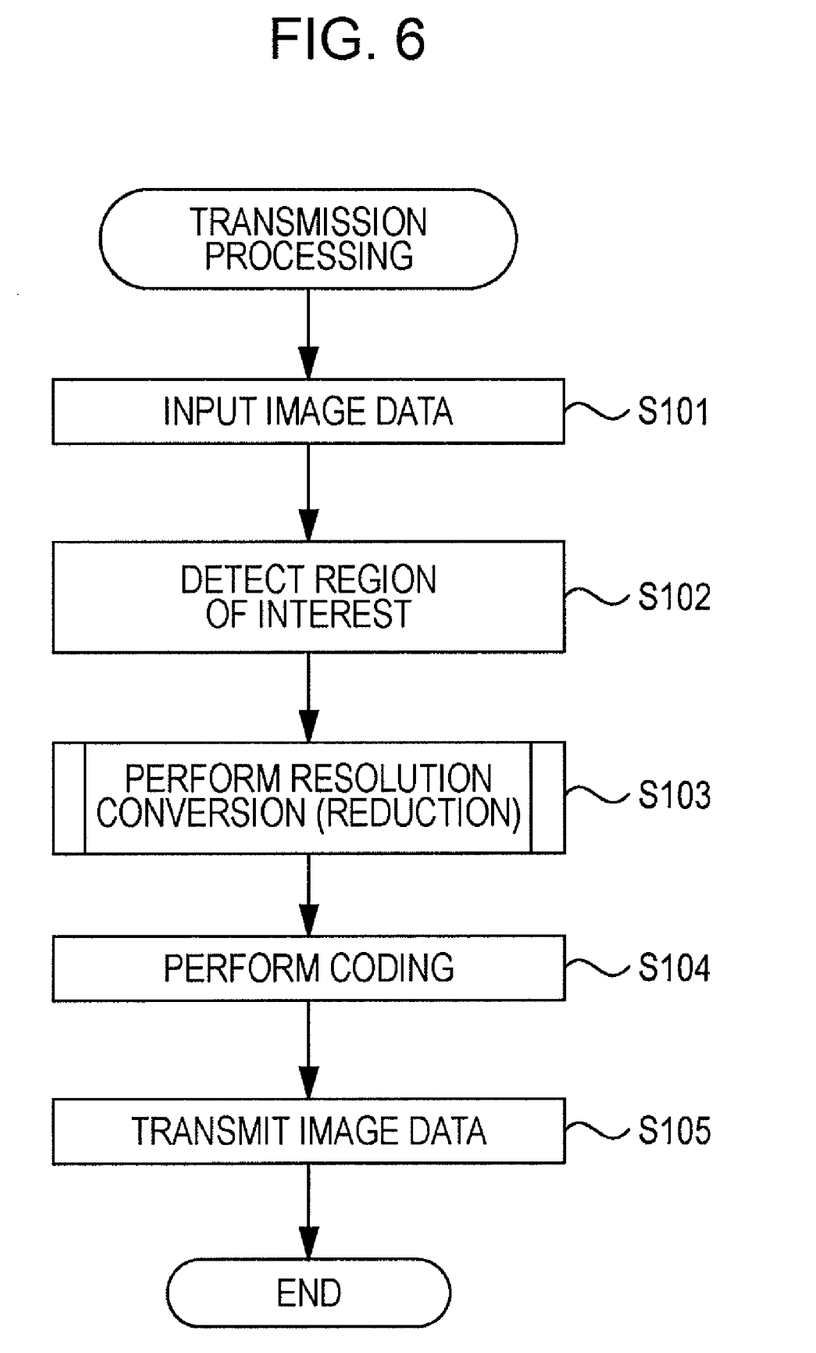
FIG. 6 is a flowchart illustrating an image transmitting program according to an embodiment of the present invention.

FIG. 6 is a flowchart illustrating an image transmitting program of the present embodiment. The image transmitting program is executed by the protocol converting apparatus 1, transmitting camera C1, or transmitting computer PC1 illustrated in FIG. 1. The image transmitting program may be installed in a storage unit in an apparatus, stored in a read-only memory (ROM), stored in a recording medium, or distributed via the network N.

First, image data is input (step S101). The image data is input by the image input unit 10 illustrated in FIG. 2. The input image data is signal-processed, as necessary, by the signal processing unit 11.

Next, detection of a region of interest is performed (step S102). This detection is performed by the region detecting unit 12 illustrated in FIG. 2. Thus, a region that matches a predetermined condition is detected as the region of interest R (see FIG. 3) in the image data.

Figure 7:
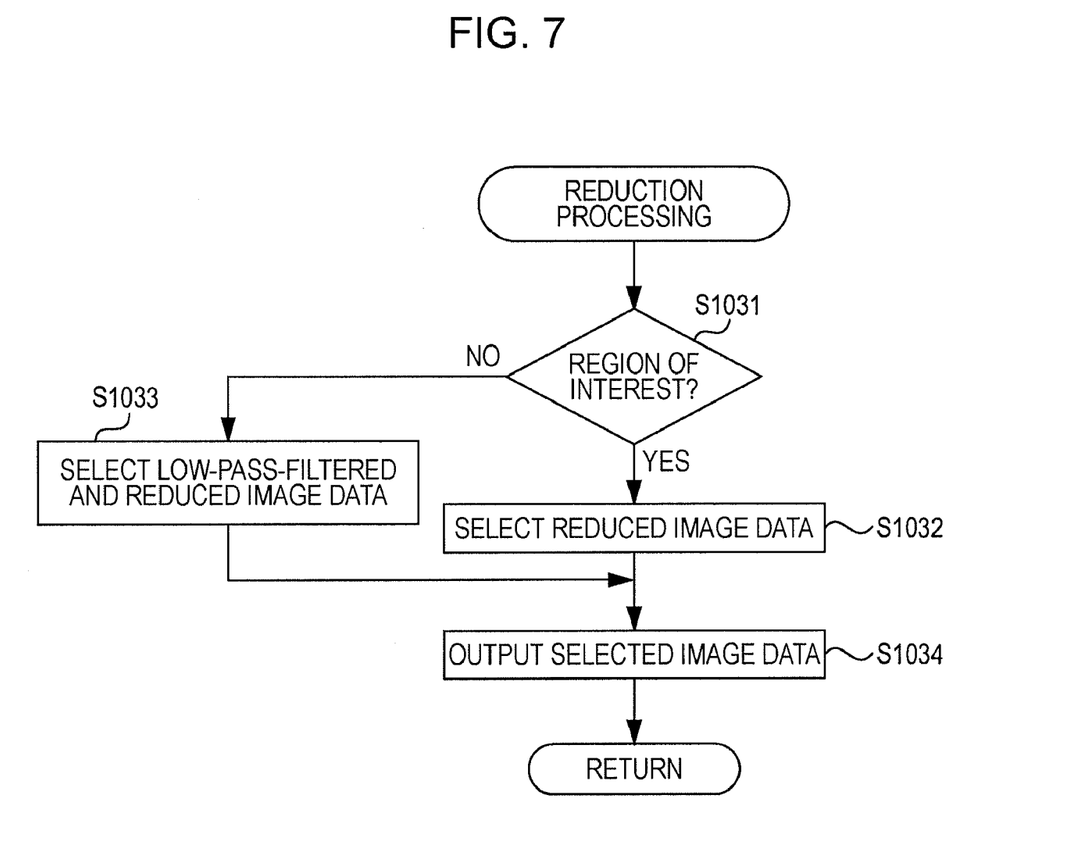
FIG. 7 is a flowchart illustrating a subroutine for resolution conversion.

Next, resolution conversion (reduction processing) is performed (step S103). The resolution conversion (reduction processing) is performed by the resolution converting unit 13 illustrated in FIG. 2. The resolution conversion is performed in accordance with a subroutine illustrated in FIG. 7. First, it is determined whether the image data corresponds to the region of interest that matches the predetermined condition (step S1031). If the image data corresponds to the region of interest, image data reduced by the reducing unit 132 of FIG. 4 without being passed through the low-pass filter 131 is selected (step S1032). On the other hand, if the image data does not correspond to the region of interest, the image data reduced after being passed through the low-pass filter 131 of FIG. 4 is selected (step S1033). Then, the image data selected in step S1032 and step S1033 is output (step S1034).

Referring back to the flowchart of FIG. 6, the image data output from the resolution converting unit 13 is coded (step S104). The coding is performed by the codec 14 illustrated in FIG. 2. The coded image data is transmitted via the network N to a destination (step S105). The transmission is performed by the transmitting unit 15 illustrated in FIG. 2. Along with the coded image data, metadata including positional information of the region of interest R and an alarm (as necessary) are transmitted to the destination.

(Image Receiving Program)

Figure 8:
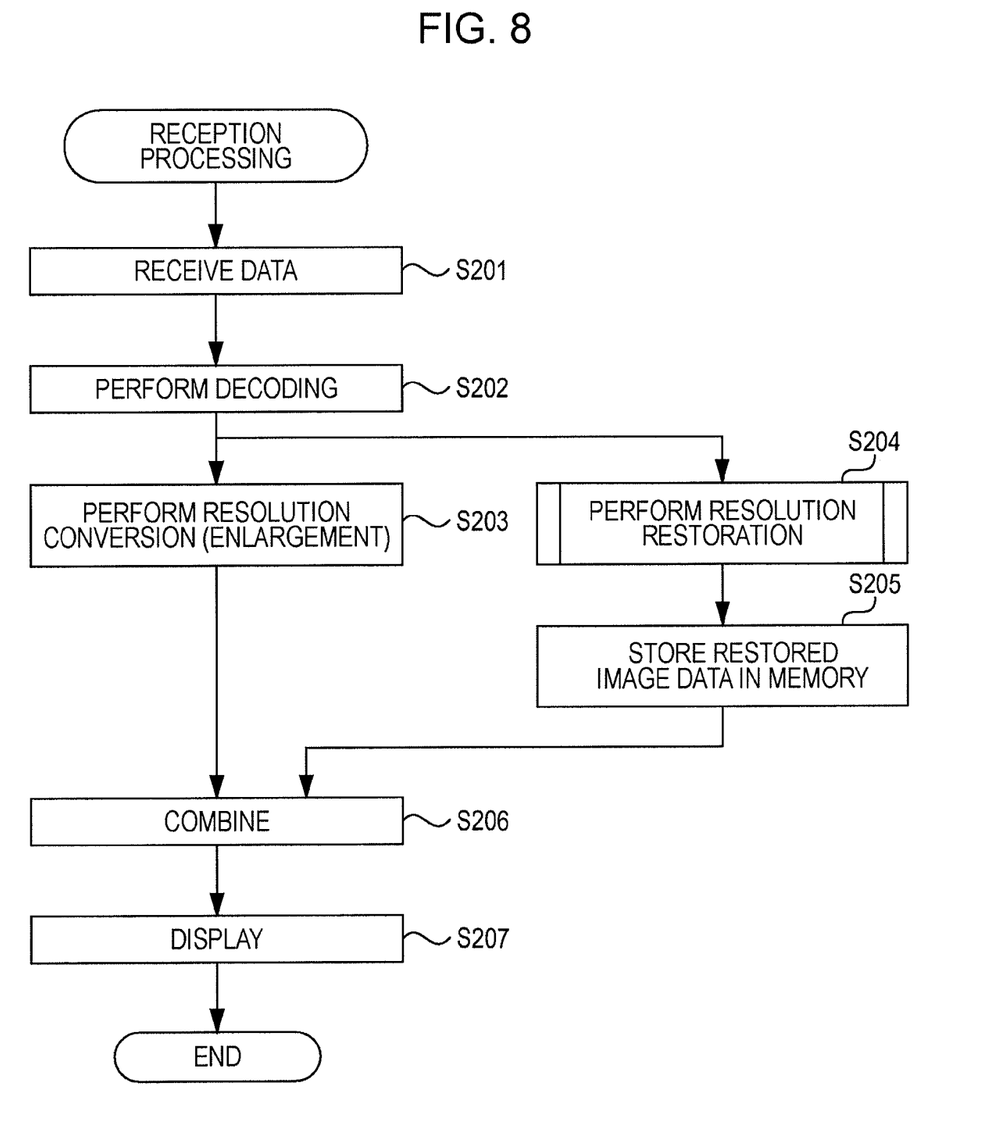
FIG. 8 is a flowchart illustrating an image receiving program according to an embodiment of the present invention.

FIG. 8 is a flowchart illustrating an image receiving program of the present embodiment. The image receiving program is executed by the recorder/viewer 2 or receiving computer PC2 illustrated in FIG. 1. The image receiving program may be installed in a storage unit in an apparatus, stored in a ROM, stored in a recording medium, or distributed via the network N.

First, image data and metadata are received (step S201). The image data and the metadata are received by the receiving unit 20 illustrated in FIG. 5. The received image data is decoded (step S202). The decoding is performed by the decoder 21 illustrated in FIG. 5.

Next, the resolution of the decoded image data is converted (i.e., the decoded image data is enlarged) (step S203). This resolution conversion (enlargement) is performed by the enlarging unit 22 illustrated in FIG. 5. The entire image data decoded in step S202 is enlarged back to the original size.

At the same time, the resolution of the decoded image data is restored (step S204). This resolution restoration is performed by the resolution restoring unit 23 illustrated in FIG. 5. Specifically, by using coordinate information contained in the metadata and indicating the region of interest, the resolution of image data in the region of interest is restored. Since the image data in the region of interest is not low-pass-filtered in the reduction processing performed by the image transmitting apparatus, specific high-frequency components remain in the image data in the region of interest. Therefore, by using this image data including the specific high-frequency components, resolution close to the original level can be restored. The resolution restoration will be further described below.

The image data in the region of interest is stored in the memory 24 after the resolution restoration is performed thereon (step S205). Then, the image data subjected to the resolution conversion (enlargement) is combined with the image data in the region of interest stored in the memory 24 (step S206). This combining is performed by the combining unit 25 illustrated in FIG. 5. At this point, the resolution conversion (enlargement) has already been performed on the entire image data. A portion of this enlarged image data, the portion being determined from the metadata and corresponding to the region of interest, is overwritten with the resolution-restored image data stored in the memory 24. Then, the resulting image data is displayed (step S207). The resulting image data is displayed on the monitor M connected to the recorder/viewer 2 or the monitor of the receiving computer PC2 illustrated in FIG. 1.

(Resolution Restoration)

Figure 9:
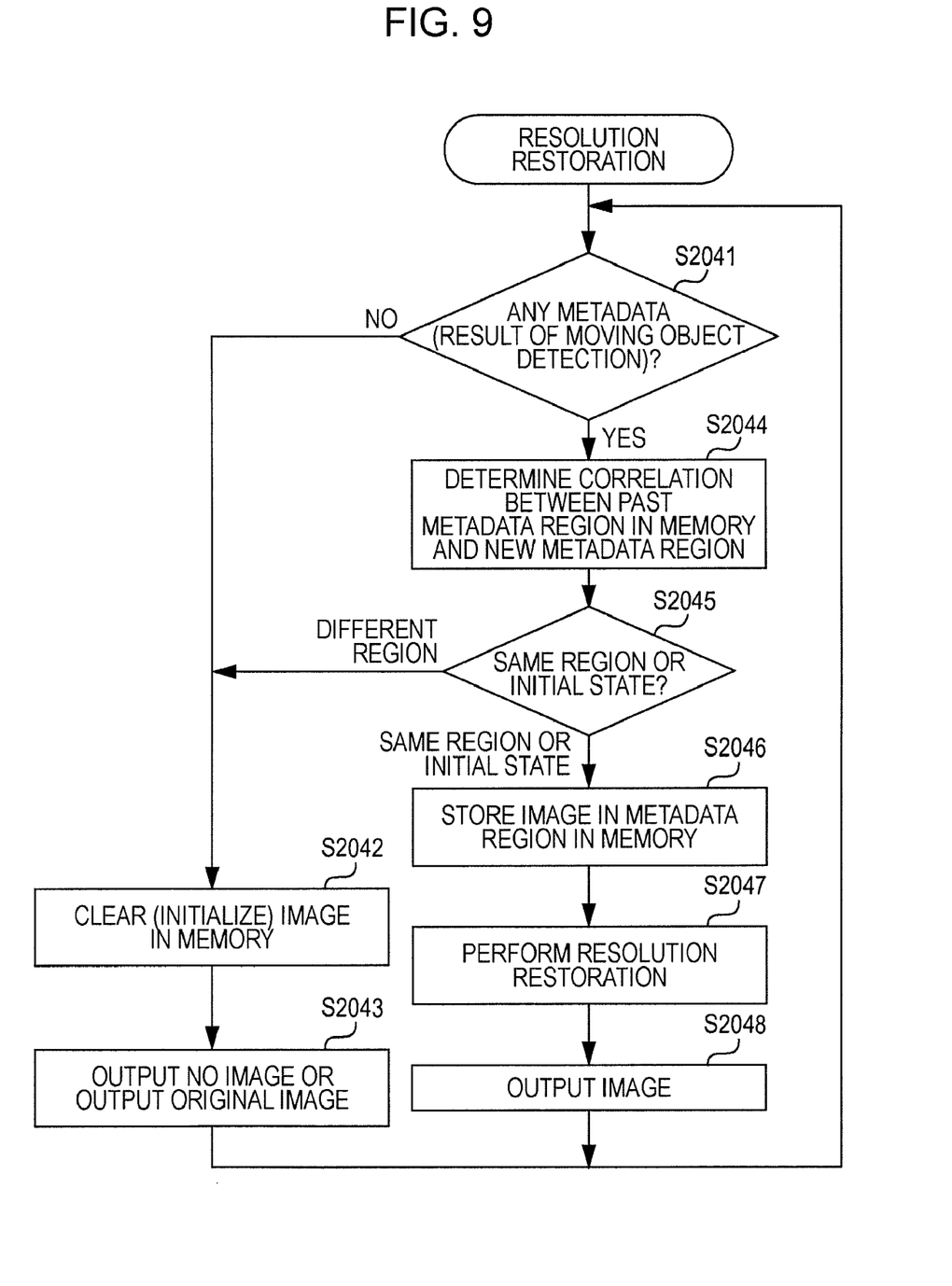
FIG. 9 is a flowchart illustrating a procedure of resolution restoration.

FIG. 9 is a flowchart illustrating a procedure of the resolution restoration. Here, a region where a moving object is detected (moving object region) is used as a region of interest. Since a moving object region moves, the resolution restoration is performed after it is confirmed that a moving object region moved is the same as the previous moving object region.

First, on the basis of the presence or absence of metadata, it is determined whether a result of moving object detection is present (step S2041). If there is no result of moving object detection, an image in the memory 24 is cleared and reset to the initial state (step S2042). The image is not output or is output as it is in its original state (step S2043).

On the other hand, if there is a result of moving object detection, a correlation between a past metadata region in the memory and a new metadata region is determined (step S2044). That is, it is determined whether the new moving object region is the same as the past moving object region. This determination can be easily made by performing a size comparison and an image data comparison (summation of absolute differences) between the past and new moving object regions.

If it is determined that the new moving object region is the same as the past moving object region (step S2045), an image in the metadata region is stored in the memory 24 (step S2046). Then, resolution restoration is performed on the stored image (step S2047) and the resulting image is output (step S2048). On the other hand, if it is determined that the new moving object region is not the same as the past moving object region (step S2045), resolution restoration is performed and an enlarged image is output.

(Modification)

In the internal configuration of the resolution converting unit 13 illustrated in FIG. 4, the selecting unit 133 makes a selection between image data reduced by the reducing unit 132 after being passed through the low-pass filter 131 and image data reduced by the reducing unit 132 without being passed through the low-pass filter 131. Alternatively, these two pieces of image data may pass through low-pass filters having different characteristics in the respective paths.

That is, the resolution converting unit 13 may include two low-pass filters having different characteristics, one being a first characteristic for reduction of the amount of data and the other being a second characteristic for allowing resolution restoration. For image data in the region of interest, the selecting unit 133 selects image data compressed after being passed through the low-pass filter having the second characteristic. For image data not in the region of interest, the selecting unit 133 selects image data compressed after being passed through the low-pass filter having the first characteristic. It is thus made possible to perform image transmission and reception which allows both a reduction in the amount of data and an increase in image resolution in the region of interest.

It should be understood by those skilled in the art that various modifications, combinations, sub-combinations and alterations may occur depending on design requirements and other factors insofar as they are within the scope of the appended claims or the equivalents thereof.

What is claimed is:

1. An image transmitting apparatus comprising:
   region detecting means for detecting, in an image, a region of interest that matches a predetermined condition;
   resolution converting means for selecting, for reducing resolution of the image, an image passed through a low-pass filter as an image outside the region of interest detected by the region detecting means and an image not passed through the low-pass filter as an image inside the region of interest; and
   transmitting means for transmitting, to a destination, the image with resolution reduced by the resolution converting means and positional information of the region of interest.

2. An image transmitting apparatus comprising:
   region detecting means for detecting, in an image, a region of interest that matches a predetermined condition;
   resolution converting means for applying, for reducing resolution of the image, low-pass filters having different characteristics to an image inside the region of interest detected by the region detecting means and an image outside the region of interest; and transmitting means for transmitting, to a destination, the image with resolution reduced by the resolution converting means and positional information of the region of interest.

3. An image receiving apparatus comprising:

receiving means for receiving an image and positional information of a region of interest in the image, the image and the positional information being transmitted from an image transmitting apparatus;

resolution restoring means for performing image quality improvement processing on the region of interest in the image received by the receiving means, the region of interest being obtained from the positional information, to increase resolution in the region of interest; and combining means for combining an image inside the region of interest processed by the resolution restoring means with an image outside the region of interest.

4. An image transmitting and receiving system comprising:

an image transmitting apparatus; and an image receiving apparatus, wherein an image is transmitted from the image transmitting apparatus to the image receiving apparatus;

the image transmitting apparatus includes region detecting means for detecting, in the image, a region of interest that matches a predetermined condition;

resolution converting means for selecting, for reducing resolution of the image, an image passed through a low-pass filter as an image outside the region of interest detected by the region detecting means and an image not passed through the low-pass filter as an image inside the region of interest; and transmitting means for transmitting, to a destination, the image with resolution reduced by the resolution converting means and positional information of the region of interest, and the image receiving apparatus includes receiving means for receiving the image and the positional information of the region of interest in the image, the image and the positional information being transmitted from the image transmitting apparatus;

enlarging means for enlarging the image received by the receiving means;

resolution restoring means for performing image quality improvement processing on the region of interest in the image received by the receiving means, the region of interest being obtained from the positional information, to increase resolution in the region of interest; and combining means for combining an image in the region of interest processed by the resolution restoring means with the image enlarged by the enlarging means.

5. An image transmitting and receiving system comprising:

an image transmitting apparatus; and an image receiving apparatus, wherein an image is transmitted from the image transmitting apparatus to the image receiving apparatus;

the image transmitting apparatus includes region detecting means for detecting, in the image, a region of interest that matches a predetermined condition;

resolution converting means for applying, for reducing resolution of the image, low-pass filters having different characteristics to an image inside the region of interest detected by the region detecting means and an image outside the region of interest; and transmitting means for transmitting, to a destination, the image with resolution reduced by the resolution converting means and positional information of the region of interest, and the image receiving apparatus includes receiving means for receiving the image and the positional information of the region of interest in the image, the image and the positional information being transmitted from the image transmitting apparatus;

enlarging means for enlarging the image received by the receiving means;

resolution restoring means for performing image quality improvement processing on the region of interest in the image received by the receiving means, the region of interest being obtained from the positional information, to increase resolution in the region of interest; and combining means for combining an image in the region of interest processed by the resolution restoring means with the image enlarged by the enlarging means.

6. A non-transitory computer-readable recording medium recording an image transmitting program for causing a computer to execute processing comprising the steps of:

detecting, in an image, a region of interest that matches a predetermined condition;

selecting, for reducing resolution of the image, an image passed through a low-pass filter as an image outside the detected region of interest and an image not passed through the low-pass filter as an image inside the region of interest; and transmitting, to a destination, the image with reduced resolution and positional information of the region of interest.

7. A non-transitory computer-readable recording medium recording an image transmitting program for causing a computer to execute processing comprising the steps of:

detecting, in an image, a region of interest that matches a predetermined condition;

applying, for reducing resolution of the image, low-pass filters having different characteristics to an image inside the detected region of interest and an image outside the region of interest; and transmitting, to a destination, the image with reduced resolution and positional information of the region of interest.

8. A non-transitory computer-readable recording medium recording an image receiving program for causing a computer to execute processing comprising the steps of:

receiving an image and positional information of a region of interest in the image, the image and the positional information being transmitted from an image transmitting apparatus;

performing image quality improvement processing on the region of interest in the received image, the region of interest being obtained from the positional information, to increase resolution in the region of interest; and combining an image inside the region of interest subjected to the image quality improvement processing with an image outside the region of interest.

9. An image transmitting apparatus comprising:

a region detecting unit configured to detect, in an image, a region of interest that matches a predetermined condition;

a resolution converting unit configured to select, for reducing resolution of the image, an image passed through a low-pass filter as an image outside the region of interest detected by the region detecting unit and an image not passed through the low-pass filter as an image inside the region of interest; and a transmitting unit configured to transmit, to a destination, the image with resolution reduced by the resolution converting unit and positional information of the region of interest.

10. An image transmitting apparatus comprising:

a region detecting unit configured to detect, in an image, a region of interest that matches a predetermined condition;

a resolution converting unit configured to apply, for reducing resolution of the image, low-pass filters having different characteristics to an image inside the region of interest detected by the region detecting unit and an image outside the region of interest; and a transmitting unit configured to transmit, to a destination, the image with resolution reduced by the resolution converting unit and positional information of the region of interest.

11. An image receiving apparatus comprising:

a receiving unit configured to receive an image and positional information of a region of interest in the image, the image and the positional information being transmitted from an image transmitting apparatus;

a resolution restoring unit configured to perform image quality improvement processing on the region of interest in the image received by the receiving unit, the region of interest being obtained from the positional information, to increase resolution in the region of interest; and a combining unit configured to combine an image inside the region of interest processed by the resolution restoring unit with an image outside the region of interest.

12. An image transmitting and receiving system comprising:

an image transmitting apparatus; and an image receiving apparatus, wherein an image is transmitted from the image transmitting apparatus to the image receiving apparatus;

the image transmitting apparatus includes a region detecting unit configured to detect, in the image, a region of interest that matches a predetermined condition;

a resolution converting unit configured to select, for reducing resolution of the image, an image passed through a low-pass filter as an image outside the region of interest detected by the region detecting unit and an image not passed through the low-pass filter as an image inside the region of interest; and a transmitting unit configured to transmit, to a destination, the image with resolution reduced by the resolution converting unit and positional information of the region of interest, and the image receiving apparatus includes a receiving unit configured to receive the image and the positional information of the region of interest in the image, the image and the positional information being transmitted from the image transmitting apparatus;

an enlarging unit configured to enlarge the image received by the receiving unit;

a resolution restoring unit configured to perform image quality improvement processing on the region of interest in the image received by the receiving unit, the region of interest being obtained from the positional information, to increase resolution in the region of interest; and a combining unit configured to combine an image in the region of interest processed by the resolution restoring unit with the image enlarged by the enlarging unit.

13. An image transmitting and receiving system comprising:

an image transmitting apparatus; and an image receiving apparatus, wherein an image is transmitted from the image transmitting apparatus to the image receiving apparatus;

the image transmitting apparatus includes a region detecting unit configured to detect, in the image, a region of interest that matches a predetermined condition;

a resolution converting unit configured to apply, for reducing resolution of the image, low-pass filters having different characteristics to an image inside the region of interest detected by the region detecting unit and an image outside the region of interest; and a transmitting unit configured to transmit, to a destination, the image with resolution reduced by the resolution converting unit and positional information of the region of interest, and the image receiving apparatus includes a receiving unit configured to receive the image and the positional information of the region of interest in the image, the image and the positional information being transmitted from the image transmitting apparatus;

an enlarging unit configured to enlarge the image received by the receiving unit;

a resolution restoring unit configured to perform image quality improvement processing on the region of interest in the image received by the receiving unit, the region of interest being obtained from the positional information, to increase resolution in the region of interest; and a combining unit configured to combine an image in the region of interest processed by the resolution restoring unit with the image enlarged by the enlarging unit.

* * * * *